(12) United States Patent
Nakano et al.

(10) Patent No.: US 10,897,793 B2
(45) Date of Patent: Jan. 19, 2021

(54) COMMUNICATION SYSTEM, COMMUNICATION APPARATUS, COMMUNICATION METHOD, AND NON-TRANSITORY MEDIUM

(71) Applicant: NEC CORPORATION, Tokyo (JP)

(72) Inventors: Shintaro Nakano, Tokyo (JP); Hideo Hasegawa, Tokyo (JP); Satoru Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/558,583

(22) PCT Filed: Mar. 17, 2016

(86) PCT No.: PCT/JP2016/058426
§ 371 (c)(1),
(2) Date: Sep. 15, 2017

(87) PCT Pub. No.: WO2016/148219
PCT Pub. Date: Sep. 22, 2016

(65) Prior Publication Data
US 2018/0054855 A1    Feb. 22, 2018

(30) Foreign Application Priority Data

Mar. 18, 2015 (JP) .................. 2015-054721

(51) Int. Cl.
*H04W 92/02* (2009.01)
*H04W 8/18* (2009.01)
(Continued)

(52) U.S. Cl.
CPC ............. *H04W 92/02* (2013.01); *H04W 8/02* (2013.01); *H04W 8/18* (2013.01); *H04W 60/005* (2013.01); *H04M 3/4228* (2013.01)

(58) Field of Classification Search
CPC ..... H04W 92/02; H04W 60/005; H04W 8/02; H04W 8/18; H04M 3/4228
(Continued)

(56) References Cited

U.S. PATENT DOCUMENTS 8,467,360 B2    6/2013 Hasegawa et al.
8,825,876 B2    9/2014 Krishnaswamy et al.
(Continued)

FOREIGN PATENT DOCUMENTS

JP    2006-340267 A    12/2006
JP    2009-284396 A    12/2009
(Continued)

OTHER PUBLICATIONS

3GPP TS 23.401 V9.5.0, 3rd Generation Partnership Project; Technical Specification Group Services and System Aspects; General Packet Radio Service (GPRS) enhancements for Evolved Universal Terrestrial Radio Access Network (E-UTRAN) access (release 9), Jun. 2010, pp. 1-259.

(Continued)

*Primary Examiner* — Hassan A Phillips
*Assistant Examiner* — Mohammed S Chowdhury
(74) *Attorney, Agent, or Firm* — Sughrue Mion, PLLC

(57) ABSTRACT

A first data center includes a first virtual network that provides a communication service in cooperation with at least a part of a communication facility of a first communication operator and a first communication unit that is operable to communicate with a second data center. The second data center includes a second virtual network that provides a communication service in cooperation with at least a part of a communication facility of a second communication operator and a second communication unit that is operable to communicate with the first data center. The first communication unit is operable to transmit to the
(Continued)

second communication unit, communication data to be transmitted from a first terminal connecting to the first virtual network via a communication facility of the first communication operator to a second terminal connecting via a communication facility of the second communication operator to the second virtual network.

17 Claims, 13 Drawing Sheets

(51) Int. Cl.
*H04W 8/02* (2009.01)
*H04W 60/00* (2009.01)
*H04M 3/42* (2006.01)

(58) Field of Classification Search
USPC .......................................................... 370/401
See application file for complete search history.

(56) References Cited

U.S. PATENT DOCUMENTS

| | | | |
|---|---|---|---|
| 9,497,176 B2 | 11/2016 | Hirano et al. | |
| 2004/0162058 A1* | 8/2004 | Mottes | H04M 3/4228 455/411 |
| 2008/0176535 A1* | 7/2008 | Cai | H04M 15/00 455/414.1 |
| 2010/0017861 A1* | 1/2010 | Krishnaswamy | H04W 48/18 726/7 |
| 2011/0044245 A1 | 2/2011 | Hasegawa et al. | |
| 2011/0314155 A1* | 12/2011 | Narayanaswamy | G06F 9/4856 709/226 |
| 2012/0208506 A1 | 8/2012 | Hirano et al. | |
| 2013/0054763 A1* | 2/2013 | Van der Merwe | H04W 12/004 709/220 |
| 2014/0040975 A1* | 2/2014 | Raleigh | H04W 12/12 726/1 |
| 2014/0105129 A1* | 4/2014 | Chen | H04W 72/0406 370/329 |
| 2014/0259012 A1* | 9/2014 | Nandlall | H04L 67/1097 718/1 |
| 2015/0012864 A1* | 1/2015 | Goodwin | G06F 9/45558 715/771 |
| 2015/0063166 A1* | 3/2015 | Sif | G06F 9/45558 370/254 |
| 2015/0109995 A1* | 4/2015 | Mathai | H04W 8/08 370/328 |
| 2015/0133079 A1* | 5/2015 | Smith | H04W 16/14 455/406 |
| 2016/0157084 A1* | 6/2016 | Tsubouchi | H04W 8/12 455/432.1 |

FOREIGN PATENT DOCUMENTS

| | | |
|---|---|---|
| JP | 2010-219799 A | 9/2010 |
| JP | 2011-044799 A | 3/2011 |
| JP | 2011-045001 A | 3/2011 |
| JP | 2011-528532 A | 11/2011 |
| WO | 2011/048768 A1 | 4/2011 |

OTHER PUBLICATIONS

Yuichi Suwa, et al., "Realization of Packet International Roaming Communication with xGSN", NTT Docomo Technical Journal, Feb. 6, 2015, pp. 39-45, vol. 12, No. 4.
International Search Report for PCT/JP2016/058426 dated Jun. 7, 2016 [PCT/ISA/210].

* cited by examiner

COMMUNICATION SYSTEM, COMMUNICATION APPARATUS, COMMUNICATION METHOD, AND NON-TRANSITORY MEDIUM

DESCRIPTION OF RELATED APPLICATION

This application is a National Stage of International Application No. PCT/JP2016/058426, filed on Mar. 17, 2016, which claims the benefit of Japanese Patent Application No. 2015-054721, filed Mar. 18, 2015, which is hereby incorporated by reference herein in its entirety.

TECHNICAL FIELD

The present invention relates to a communication system, a communication apparatus, a communication method, and a non-transitory medium.

BACKGROUND

Roaming is a service whereby a service of a communication operator with which a user contracts can be received, even outside a service range of the communication operator, by using a communication facility of another communication operator with which the one communication operator cooperates. By using an international roaming service, a service can be received in overseas by using a facility of an overseas local operator.

It is to be noted that, among communication operators, a communication operator borrowing a necessary infrastructure(s) from a communication operator (Mobile Network Operator: MNO) (also referred to as a "carrier" or "MNO carrier") having a wireless infrastructure such as a base station or a communication facility such as a core network and the like, and providing a mobile communication service under its own brand, is called a virtual communication operator (Mobile Virtual Network Operator: MVNO). A virtual communication operator is also called "MVNO carrier".

In connection with roaming, for example, Patent Literature 1 discloses a technique which makes it possible for a remote communication terminal (User Equipment: UE) to perform a local IP (Internet Protocol) access to a locally accessible network with a simpler procedure, while realizing efficiency of cost and equipment. When establishing a PDN connection between LIA (Local IP Access)-PDN (Packet Data Network), UE also transmits information on the LIA domain network that desires local IP access. Based on this information, the LIA-PDN establishes a PDN connection with the LIA domain network, and the LIA-PDN performs packet transfer so that the UE accesses the LIA domain network through these PDN connections.

Patent Literature 2 discloses a method wherein an option related to a communication session on a network related to MVNO receiving an access request from a client, at least one MNO out of a plurality of MNO sets, and a selected communication session is established.

Patent Literature 3 discloses a common-base communication apparatus, wherein when a user who has made a contract with a first licensed communication operator permitted to provide a wireless communication service to a wireless communication terminal issues a connection request from an area where a second licensed communication operator provides a wireless communication service, even if the first licensed communication operator and the second licensed communication operator do not have a roaming service contract, the second licensed communication operator performs control to connect a wireless communication terminal located in an area in which the second licensed communication operator provides the wireless communication service, to a requested communication destination.

Patent Literature 1: WO2011/048768A
Patent Literature 2: JP Patent Kohyo Publication No. 2011-538532A
Patent Literature 3: JP Patent Kokai Publication No. 2012-219799A

NON-PATENT LITERATURE

Non-patent Literature 1:
Yuichi Suwa et al., "Realization of Packet International Roaming Communication with xGSN", NTT Docomo Technical Journal, Vol. 12, No. 4, Feb. 6, 2015 Search, Internet URL: https://www.nttdocomo.co.jp/binary/pdf/corporate/technology/rd/techn ical_journal/bn/vol12_4/vol12_4_039jp.pdf

SUMMARY

The analysis of the related art is given below.

The inventors of the present invention have newly found an issue to make it possible to eliminate roaming between carriers at the time of roaming of a terminal of a user contracting with a MVNO carrier, and invented a means to solve the issue. It is noted that none of the Patent Literatures 1 to 3 discloses any recognition of the issue.

An object of the present invention is to provide a system, an apparatus, a method, and a non-transitory medium storing a program for solving the above issue.

According to one aspect of the present invention, there is provided a communication system comprising:

at least a first data center providing a cloud service to a user, wherein the first data center comprises:
a first virtual network that provides a communication service in cooperation with at least a part of a communication facility of at least a first communication operator; and
a first communication unit that is operable to communicate with a second communication unit in a second data center, wherein first communication unit is operable to transmit to the second communication unit, communication data to be transmitted from a first terminal connecting to the first virtual network via the communication facility of the first communication operator to a second terminal connecting via a communication facility of a second communication operator to a second virtual network in the second data center, the second virtual network providing a communication service in cooperation with at least a part of the communication facility of the second communication operator.

According to another aspect of the present invention, there is provided a communication apparatus constituting a network of a first data center that provides a cloud service to a user, the apparatus comprising a first unit configured to connect to a first virtual network that is included in the first data center and provides a communication service in cooperation with at least a part of a communication facility of a first communication operator, the first unit being operable to communicate with a second data center including a second virtual network providing a communication service in cooperation with at least a part of the communication facility of a second communication operator; and a second unit configured to control a transmission destination of communication data transmitted by the first unit, the second unit controlling the first unit to transmit to the second data center, communication data that is to be transmitted from a first terminal connecting via a communication facility of the first communication operator to the first virtual network to a second terminal connecting via a communication facility of a second communication operator to the second virtual network.

According to another aspect of the present invention, there is provided a non-transitory computer-readable recording medium storing therein a program causing a computer of a communication apparatus constituting a network in a first data center providing a cloud service to a user, to execute:

a first processing to connect to a first virtual network that is included in the first data center and provides a communication service in cooperation with at least a part of a communication facility of a first communication operator, the first processing operable to communicate with a second data center including a second virtual network providing a communication service in cooperation with at least a part of the communication facility of the second communication operator; and a second processing to control a transmission destination of communication data transmitted by the first processing, the second processing controlling the first processing to transmit to the second data center, communication data that is to be transmitted from a first terminal connecting to the first virtual network via a communication facility of the first communication operator to a second terminal connecting via a communication facility of a second communication operator to the second virtual network.

According to another aspect of the present invention, there is provided a communication method comprising:

a first data center that provides a cloud service, by using a first virtual network that provides a communication service in cooperation with at least a part of a communication facility of a first communication operator, and a first communication unit, being operable to communicate with a second communication unit in a second data center that provides a cloud service and a second virtual network that provides a communication service in cooperation with at least a part of communication facility of a second communication operator; and communication data from a first terminal connecting via the communication facility of the first communication operator to the first virtual network in the first data center, being capable to be transmitted via the first communication unit of the first data center and via the second communication unit of the second data center, to a second terminal connecting via the communication facility of the second communication operator to the second virtual network in the second data center.

According to the present invention, a terminal of a user contracted to an MVNO carrier can eliminate roaming between carriers when roaming. Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

In the following, related inventions, as premises of the present invention will be described, and then several Example Embodiments of the present invention will be described.

In SDN (Software Defined Network)/NFV (Network Function Virtualization), a plurality of network appliances, each of which individually requires a casing, are integrated on a server using virtualization technology. For example, virtualization such as an Evolved Packet Core (EPC) which is a core network of a communication operator (carrier) is in progress. In a virtualized EPC (Virtualized EPC: vEPC), at least one or all of nodes, such as SGW (Serving Gateway), PGW (PDN (Packet Data Network) Gateway), MME (Mobility Management Entity), HSS (Home Subscriber Server), PCRF (Policy and Charging Rules Function), is(are) implemented in a software-based manner by an application(s) operating on the virtual machine(s).

For example, a virtual EPC network (vEPC) that virtualizes EPC can be implemented on a general-purpose server or the like disposed in a data center (DC) that provides a cloud service (or data center service) to a client can do.

Each element (function) of an EPC network will be briefly described here (for details, reference may made to 3GPP TS 23.401 V 9.5.0 (2010 June) etc)). MME performs various type of processing, such as mobility management and authentication of a terminal (mobile terminal) 1 (UE), setting of a user data transfer path, and so forth. In addition, MME cooperates with HSS to authenticate a user. HSS holds user profile information (including contract information, authentication information, etc.). SGW performs transmission and reception of user data to and from a base station, and performs setting and release of a communication path between SGW itself and PGW. PGW connects to a packet data network (PDN) such as IMS (IP Multimedia Subsystem) or the Internet and allocates an IP (Internet Protocol) address (private IP address) to a terminal. PCRF is a policy control apparatus that determines policy control such as QoS (Quality of Service) and an accounting control rule. Based on notification information (policy) from PCRF, PGW and SGW perform policy control on a per packet basis, for example.

Figure 1:
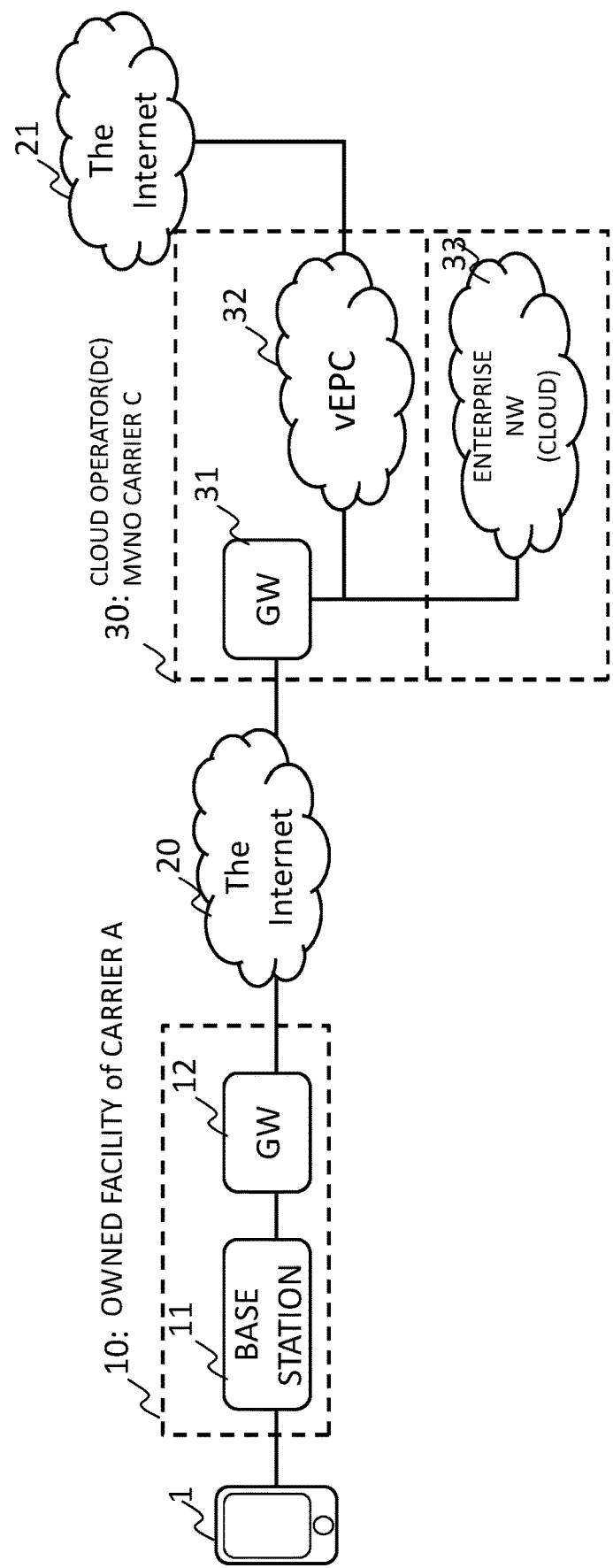
FIG. 1 is a diagram illustrating Related Invention 1.

FIG. 1 is a diagram for explaining Related Invention 1. In the following, it is assumed that a data center operator having a data center (DC) within a business establishment is a cloud operator that provides various data center services as cloud services (for example, file storage, data sharing, electronic-mail, use of a server, etc.) to clients. A virtual EPC network (vEPC) 32 is constructed on a server (not illustrated) in the data center (DC) 30, whereby, as an MVNO carrier (MVNO carrier C), a communication service is provided to a client.

A cloud operator (in this example, a cloud operator is MVNO carrier C) provides a communication service using a virtual network (Virtual Network) constructed by borrowing a communication facility 10 such as a base station 11 lent from the MNO carrier. A terminal 1 is connected, via the base station 11 of an MNO carrier A, a gateway (GW), and the Internet 20, to a virtual EPC network 32 on a server (not illustrated) installed in the data center 30 of the cloud operator. The terminal 1 receives, via the virtual EPC network 32, Internet connection service, cloud type content cache service and so forth that are provided by the cloud operator. In the example of FIG. 1, an enterprise network 33 is also made cloud-based by using a server virtualization technology, and a network virtualization technology such as VLAN (Virtual Local Area Network), or the like. In FIG. 1, in place of the virtual EPC network (vEPC) 32, an EPC network based on an actual machine without using virtualization (MVNO carrier C's own EPC) may, as a matter of course, be provided in the data center 30. In FIG. 1, a VPN (Virtual Private Network) may be provided for connection between the terminal 1 and the gateway 31, or between the terminal 1 and the enterprise network 33.

Figure 2:
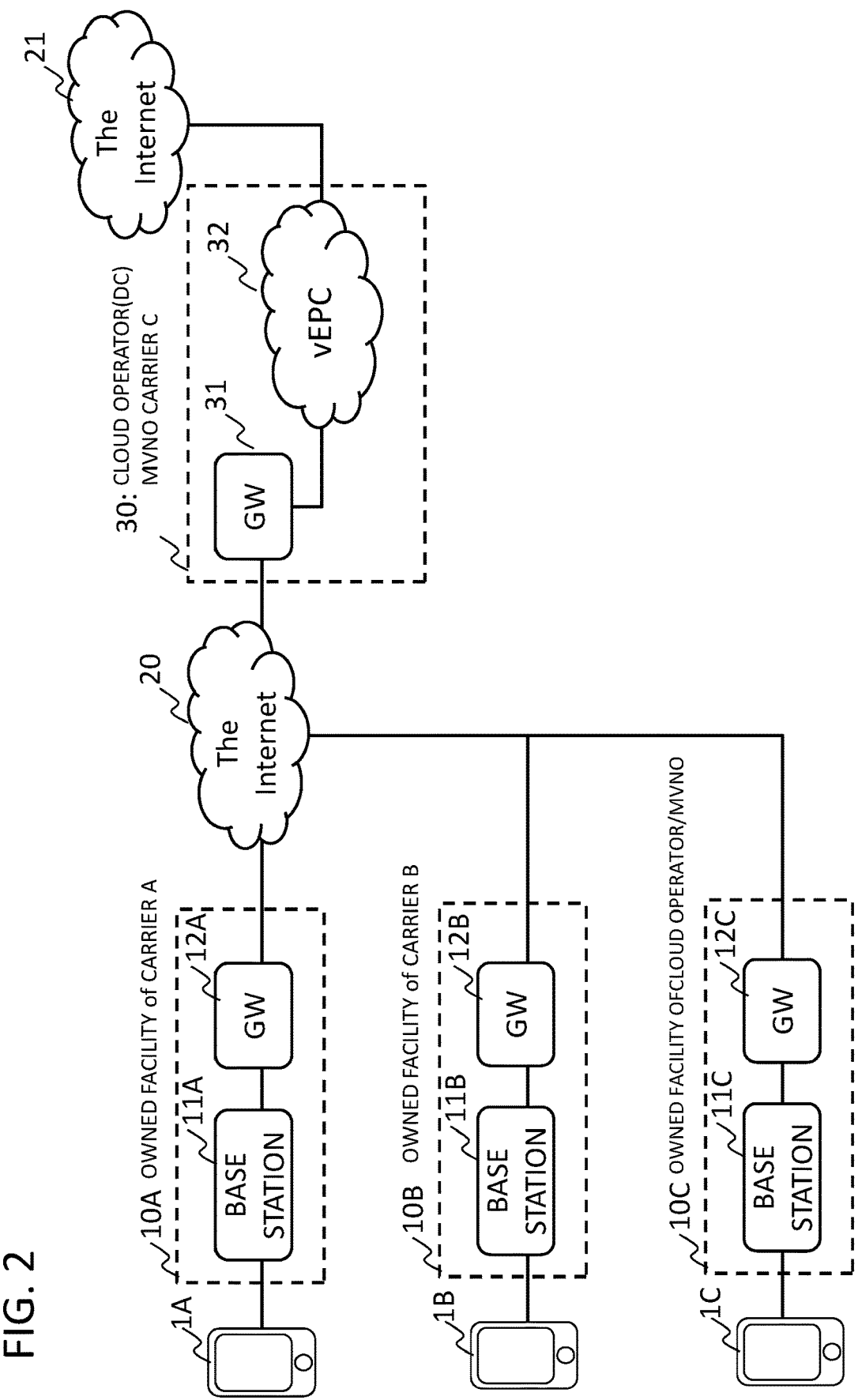
FIG. 2 is a diagram illustrating Related Invention 2.

FIG. 2 is a diagram illustrating Related Invention 2. Only the virtual EPC network 32 is operated in the data center (DC) 30 of the cloud operator, while facilities (base stations) owned by a plurality of carriers are used. When a facility with a small investment amount like a femtocell is used, the cloud operator itself may install the base station. In the example of FIG. 2, a base station 11C is a base station of a femtocell, a facility 10 C including the base station 11 C and a gateway (GW) 12C is a communication facility owned by a cloud operator that owns the data center (DC) 30. Therefore, regarding the facility 10C such as the base station 11C and the gateway 12C, the cloud operator is also an MNO carrier.

On the other hand, in the case wherein a cloud operator that owns the data center (DC) 30 borrows an owned facility 10 A of the carrier A and a owned facility 10 B of the carrier B, and, by using the owned facilities 10 A and 10 B, provides a communication service to a terminal of a user contracting with the cloud operator, the cloud operator will conduct a business as MVNO carrier C. It is a matter of course that instead of the virtual EPC network 32 in FIG. 2, an EPC network based on an actual machine without virtualization may be provided.

Figure 3:
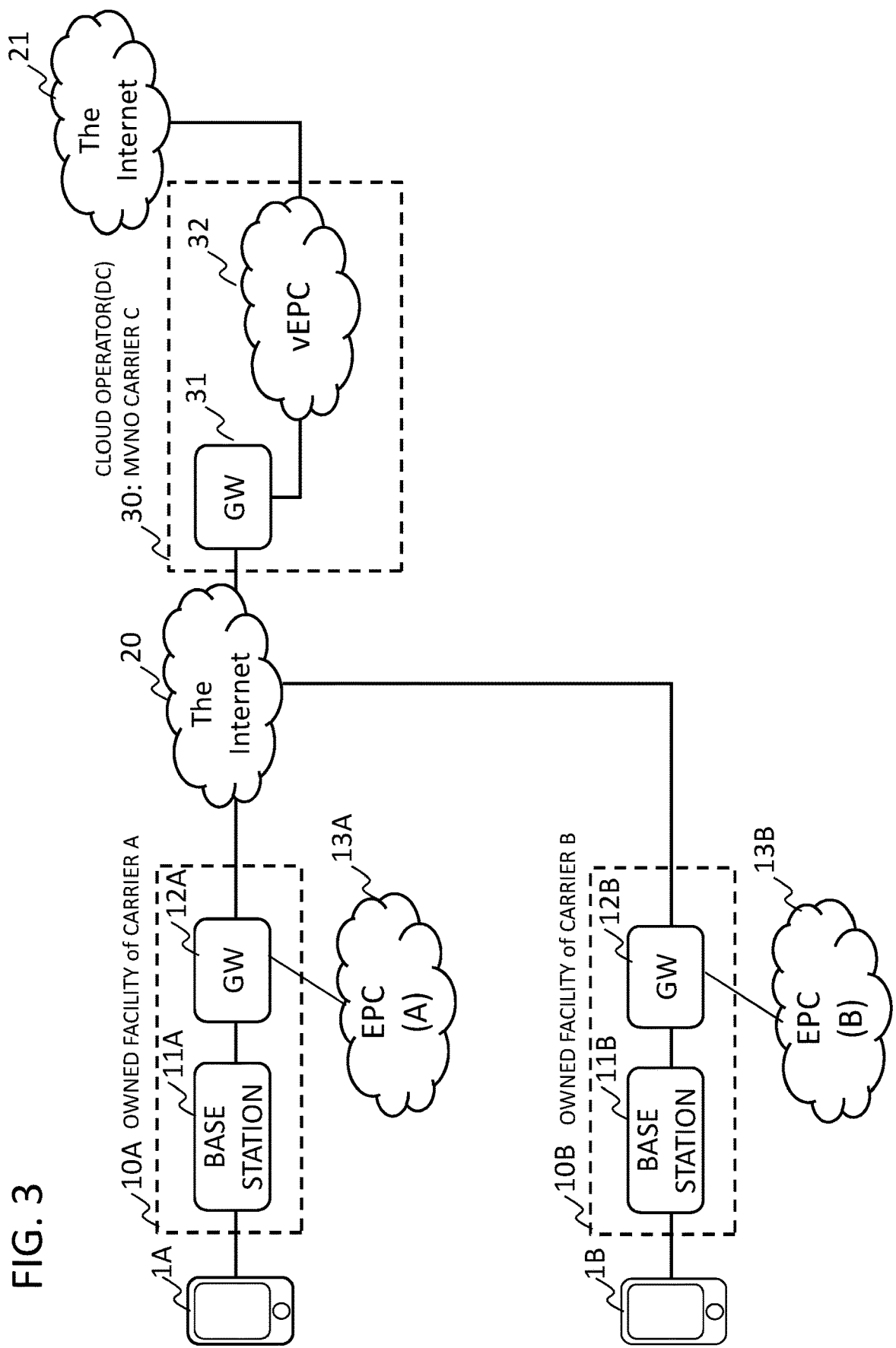
FIG. 3 is a diagram illustrating Related Invention 3.

FIG. 3 is a diagram for explaining Related Invention 3. In Related Invention 3, terminals 1A and 1B of users contracting respectively with the carrier A and carrier B which are MNO carriers connect to an EPC network 13A owned by the carrier A and an EPC network 13B owned by the carrier B, respectively.

In FIG. 3, a terminal (not illustrated) contracting with an MVNO carrier C (cloud operator) that borrows communication facility such as the base station 11A or 11B from the carrier A or B is connected to a virtual EPC network 32 in the data center 30 of the cloud operator.

Figure 4:
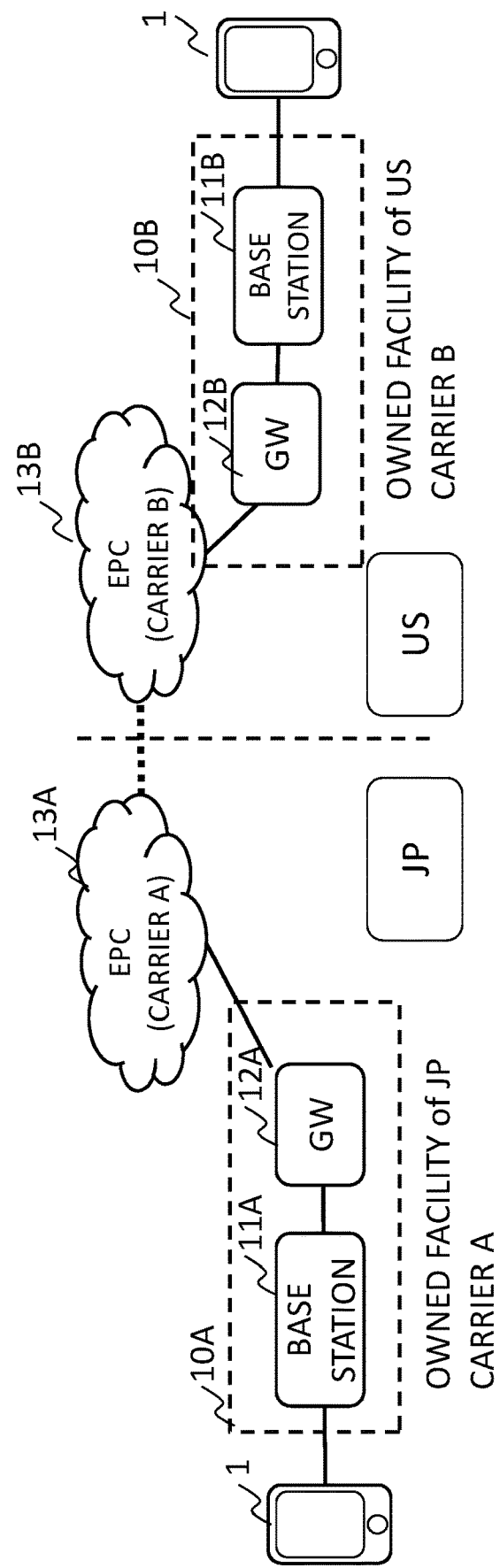
FIG. 4 is a diagram illustrating Related Invention 4.

FIG. 4 is a diagram illustrating Related Invention 4. In FIG. 4 as well, as in FIG. 3, a cloud operator, which is a data center operator that owns a data center (DC), becomes an MVNO carrier C. As a facility such as a base station, etc, an existing facility of an MNO carrier or an own facility of the carrier C may be used.

In FIG. 4, an international roaming (international roaming across different carriers) is schematically illustrated in which a service of the carrier A with which the terminal has contracted in Japan (Japan: JP) is received in US (United States of America) by using communication facility of another carrier B that the carrier A cooperates. When the roaming is performed, a technique for establishing a tunnel between a roaming source carrier and a roaming destination carrier, or communication using NAT (Network Address Translation) is used (for example, reference may be made to Non-Patent Literature 1). There is a mode in which direct connection is implemented by a GTP (GPRS (General Packet Radio Service) Tunneling Protocol) tunnel between a packet relay apparatus of a core network of a carrier of a roaming source and a packet relay apparatus of a core network of a roaming destination carrier. In a packet relay apparatus that allocates a private IP address to a terminal, when sending a packet from the terminal to an overseas node subscribing to an overseas communication carrier, the packet relay apparatus converts the private IP address of the packet to a global IP address using a NAT function and sends the packet to a roaming relay operator, which converts the global IP address of the packet from a node of an overseas communication carrier to a private IP address to transfer the packet.

Figure 5:
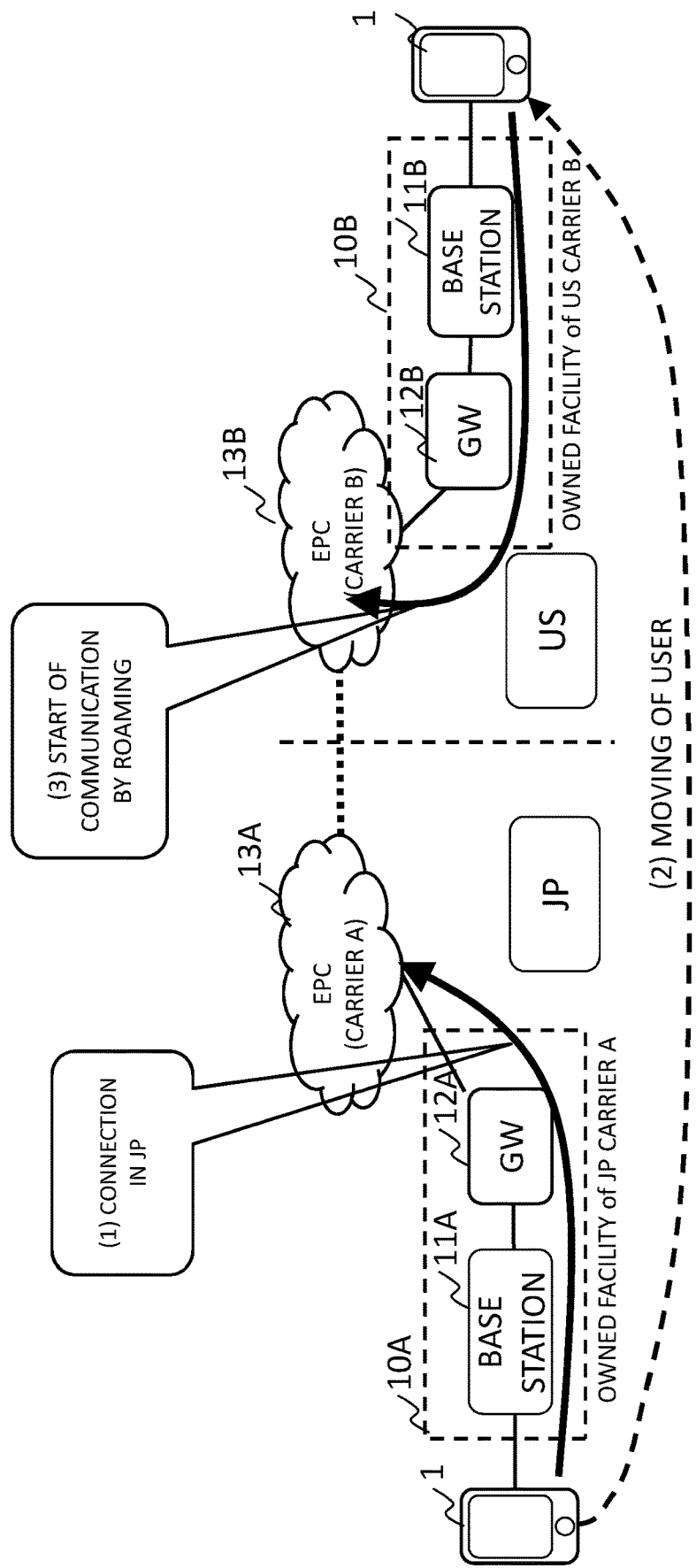
FIG. 5 is a diagram illustrating Related Invention 4.

FIG. 5 schematically illustrates a situation in which a user moves from Japan to US in the system of FIG. 4 and a base station 11 B and so forth of the US carrier B are used.

In Japan, a terminal 1 connects to an EPC network 13A of the carrier A via a base station 11A (Step 1). The user moves to the US (Step 2). The user's terminal 1 connects to an EPC network 13B of the carrier B of the US via a base station 11B and starts communication by roaming (Step 3).

It is noted that in FIG. 4, there is included an arrangement wherein the terminal 1 communicating with the facility owned by the carrier A communicates with a terminal of the connection destination in the United states (a terminal communicating with facility owned by the carrier B in the United states) by using the international roaming function.

Example Embodiment 1

Figure 6:
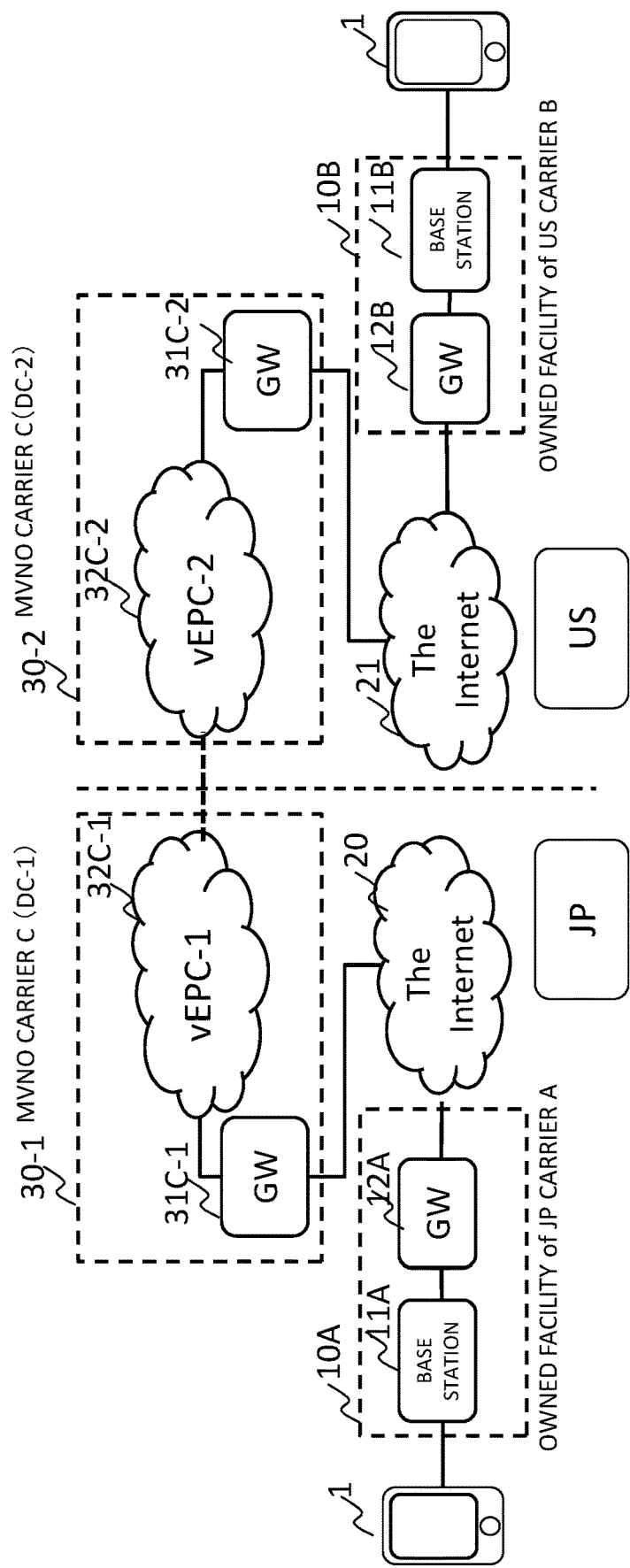
FIG. 6 is a diagram illustrating a basic configuration of example embodiment 1.

FIG. 6 is a diagram illustrating a basic configuration of Example Embodiment 1. In the example of FIG. 5, carrier roaming (JP carrier A to US carrier B) is performed across countries between Japan and the United States. Contrary to this, referring to FIG. 6, in Example Embodiment 1, inter-carrier roaming across countries is not performed. That is, a terminal 1 of a user contracting with a MVNO carrier C connects to a base station 11A of the facility 10A of a Japanese carrier A (MNO) in Japan, and communicatively connects from the gateway 12 A via the Internet 20 to a virtual EPC network 32C-1 via a gateway (GW) 31C-1 of the data center (DC-1) 30-1 owned by a MVNO carrier that provides a cloud service. The MVNO carrier C provides a communication service using a network (virtual network)

constructed by borrowing at least a part of the owned facility 10A of the MNO carrier A (the base station 11A, etc.) from the MNO carrier A.

In the United States, the terminal 1 of the user contracting with the MVNO carrier C connects to a base station 11 B of the facility 10 B of a carrier B (MNO) in the United States, and communicatively connects, from a gateway (GW) 12 B via the Internet 21 to an virtual EPC network 32C-22, via a gateway (GW) 31C-22 of a data center (DC-2) 30-2 owned by the MVNO carrier C in the United States (the same as the Japanese MVNO carrier C, or a communication operator such as a subsidiary or a parent company) that provides a cloud service. As a result, Example Embodiment 1 can significantly reduce an international roaming fee, which is rather expensive. In the United States, the MVNO carrier C provides a communication service using a network (virtual network) constructed by borrowing at least a part of the owned facility 10B of the MNO carrier B (the base station 11B, etc.) from the MNO carrier B, for example. When the terminal 1 of a user contracting with the MVNO carrier C moves from Japan to the United States and communicates with a terminal in Japan, the terminal 1 can communicate with a terminal in Japan from the carrier A's base station 11A, via the virtual EPC network 32C-22 of the US data center (DC-2) 30-2 of the MVNO carrier C, the virtual EPC network 32C-1, and the gateway (GW) 31C-1 of the carrier C's Japanese data center (DC-1) 30-1. A terminal of a user contracting with the MVNO carrier can eliminate an international roaming between a carrier of the United states and a carrier of Japan, at the time of international roaming. It is noted that in FIG. 6, "the United States (US)" is only an example and the United States (US)" may well be replaced by another country. In FIG. 6, the Internet 20 and 21 are illustrated as separate elements in Japan and the United States for the ease of description, it is a matter of course, that one Internet as a whole may be used.

However, because Japan and the United States are across the counties, the terminal 1 will access data center (DC-1) 30-1 in Japan and data center (DC-2) 30-2 in the United States. A data center may be shared across the countries by Japan and the United States.

Figure 13:
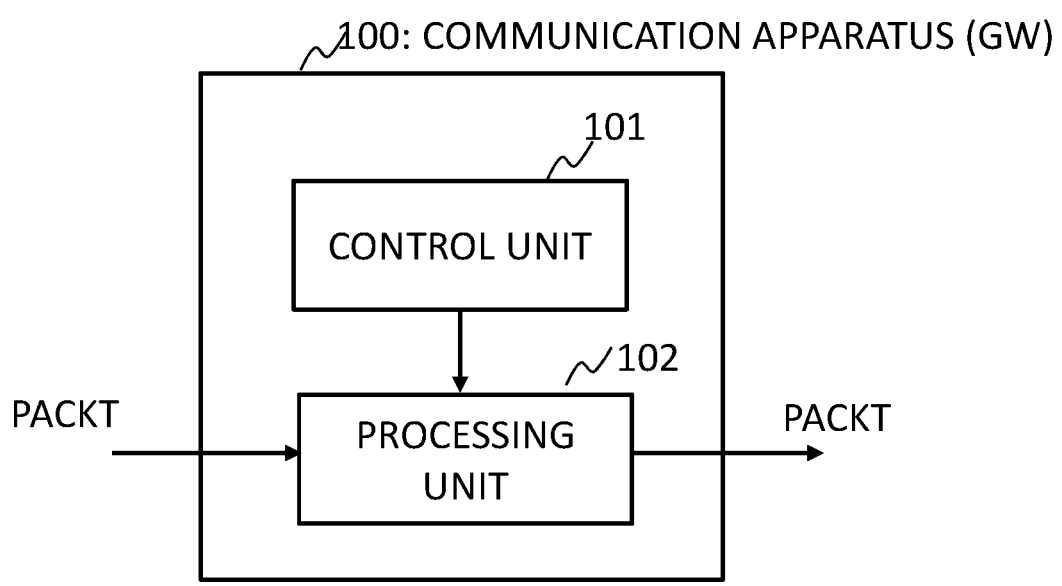
FIG. 13 is a diagram illustrating a configuration example of a communication apparatus (gateway) according to Example Embodiment 1 and the other Example Embodiments.

FIG. 13 is a diagram illustrating a communication apparatus 100 according to the first embodiment. In Example Embodiment 1 illustrated in FIG. 6, the communication apparatus 100 may be implemented as gateways (GW) 31C-1 and 31C-22, for example. The gateways (GW) 31C-1 and 31C-22 in FIG. 6 may each include the communication apparatus 100 in FIG. 13, for example. Alternatively, the gateways (GW) 31C-1 and 31C-22 in FIG. 6 may be constituted by the communication apparatus 100 in FIG. 13, respectively. The following describes a case where the communication apparatus 100 is the gateway (GW) 31C-1 in FIG. 6. Referring to FIG. 13, a processing unit 102 receives a packet transferred to the gateway (31C-1), and transmits the received packet to a forwarding destination under control of a control unit 101. The processing unit 102 is connected to a virtual EPC network (for example, vEPC-1 in FIG. 6) that is included in a data center (for example, DC-1 in FIG. 6) and that provides a communication service by cooperating with at least a part of communication facility (for example, 10A in FIG. 6) owned by a first carrier (carrier A) and can communicate with a second data center (for example, DC-2 in FIG. 6) including a virtual EPC network (for example, vEPC-2 in FIG. 6) that provides a communication service by cooperating with at least a part of communication facility (for example, 10 B in FIG. 6) owned by a second carrier (carrier B).

The control unit 101 controls the processing unit 102 to transmit data, from the virtual EPC network (vEPC-1 in FIG. 6) of the data center (for example, DC-1 in FIG. 6) in which the control unit 101 is installed, to a destination data center. For example, the control unit 101 controls the processing unit 102 such that communication data that is to be transmitted from a terminal connecting via the communication facility (10A in FIG. 6) to a virtual EPC network (32C-1 in FIG. 6) of the data center (DC-1 in FIG. 6) to a terminal connecting via the communication facility (10B in FIG. 6) to a virtual EPC network (vEPC-2 in FIG. 6) of the data center (DC-2 in FIG. 6), is transmitted to the data center (DC-2 in FIG. 6). The gateway (GW) 31C-22 has the same configuration (but a connection destination of the gateway (GW) 31C-22 is the first data center (DC-1 in FIG. 6)). At least a part of the processing of the control unit 101 and the processing unit 102 may be executed by a computer constituting the gateways (GW) 31C-1 and 31C-22.

It is noted that the communication apparatus 100 in FIG. 13 can be applied not only the gateways (GW) 31C-1 and 31C-22 of Example Embodiment 1 illustrated in FIG. 6, but also can be applied to the gateway (GW) 31C-1, 31C-22 of other Example Embodiments below described, as well.

As described above, according to Example Embodiment 1, a roaming operation between the same carriers (the same MVNO carrier) is performed between data centers of different countries.

Figure 7:
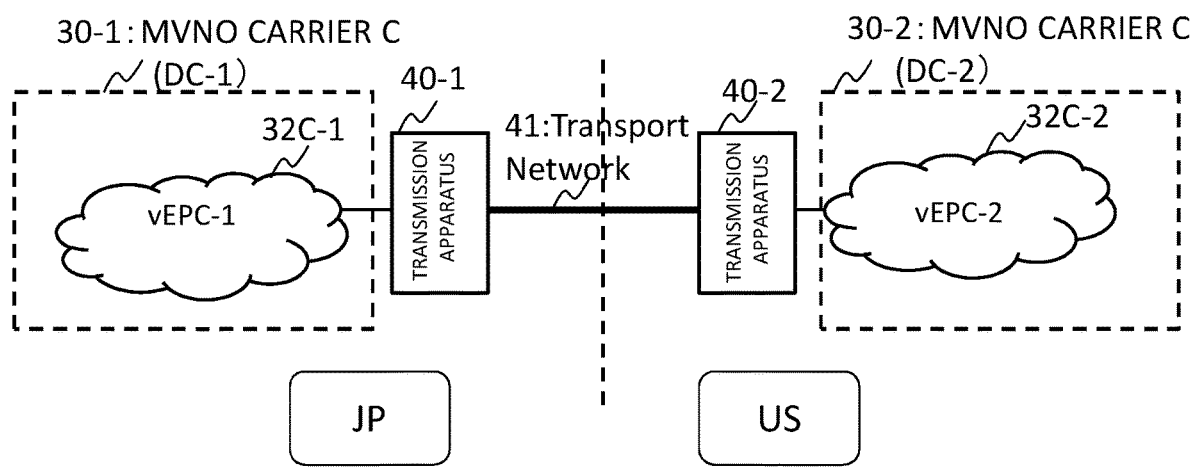
FIG. 7 is a diagram illustrating Example Embodiment 1.

FIG. 7 is a diagram schematically illustrating a configuration example of a relay apparatus that connects data centers (DC-1, DC-2) of MVNO carrier C in Japan and the United States. Virtual EPC networks 32C-1 and 32C-2 of the data centers (DC-1, DC-2) of the MVNO carriers C 30-1 and 30-2 in Japan and the United States are connected to the transmission apparatuses 40-1 and 40-2. Each of the transmission apparatuses 40-1 and 40-2 includes an optic-electric conversion apparatus and an electric-optic conversion apparatus and is connected to each other via a optical cable network (Transport network) 41 (also including an optical cable which is laid as a submarine cable between Japan and the United States). Communication data sent from each data center is converted into a frame for optical transmission and transmitted between the transmission apparatuses 40-1 and 40-2. Here, a communication network composed by various routers or the like may be provided between each of the data centers and transmission apparatuses 40-1 and 40-2. In this case, a packet which is a target of an international roaming may be associated with the transmission apparatus to which an optical cable network is connected, and the gateway 31 of each data center may transmit the packet which is a target of the international roaming to the transmission apparatuses 40-1 and 40-2.

Figure 8:
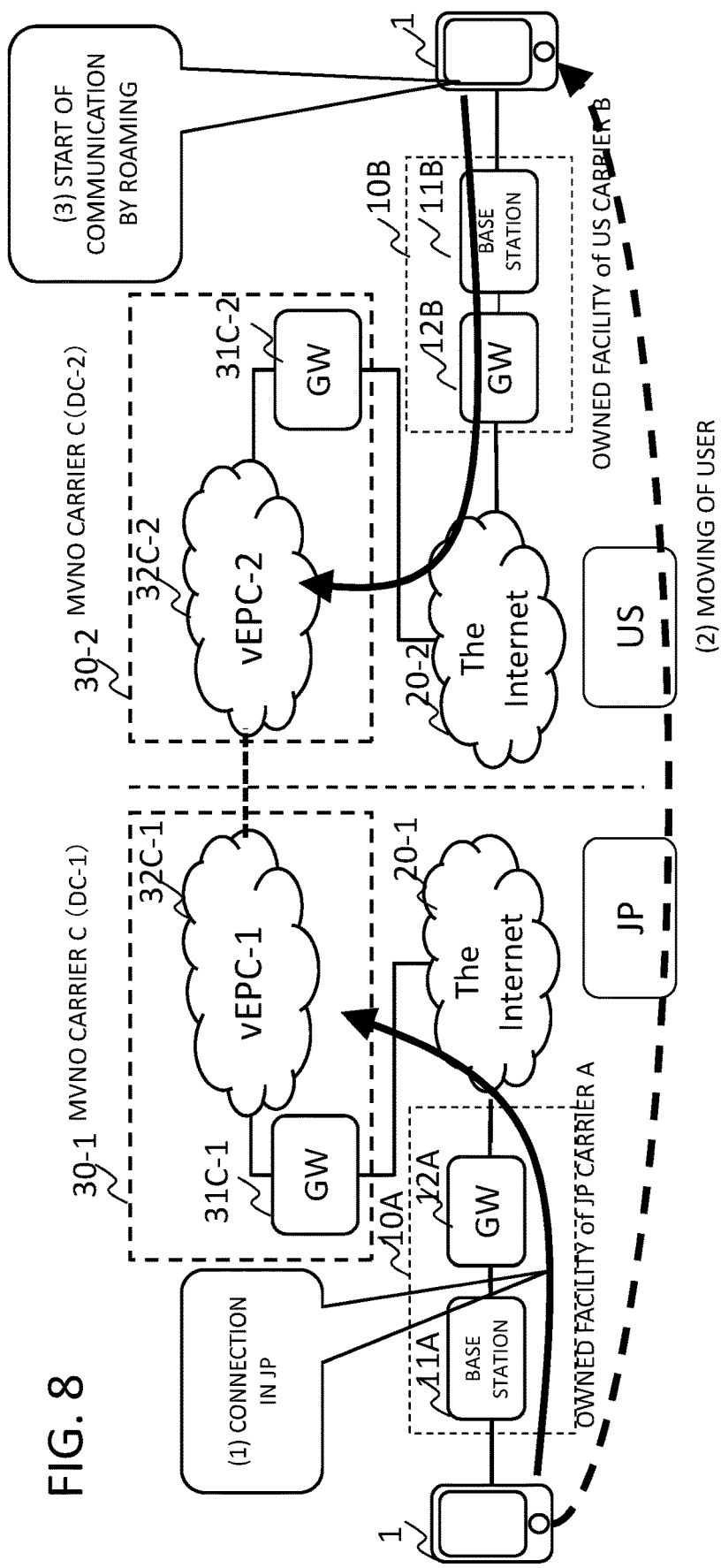
FIG. 8 is a diagram illustrating Example Embodiment 1.

FIG. 8 is a diagram illustrating the first embodiment shown in FIG. 6. It is assumed that a user subscribing to a MVNO carrier C moves from Japan to the United States to perform an international roaming. In Japan, the terminal 1 contracting with the MVNO carrier C uses a facility of a MNO carrier A (such as a base station 11 A) to connect via the Internet 20-1 to a virtual EPC network 32C-1 in the data center of the MVNO carrier C (DC-1) 30-1 (1).

The user moves to the United States (2). The terminal 1 of the user uses a facility of the MNO carrier B (such as base station 11 B) to connect via the Internet 20-2 to a virtual EPC network 32C-2 in the data center of the MVNO carrier C (DC-2) 30-2 and initiates communication by roaming (3).

In this way, the terminal access in the United States is made to the data center (DC-2) 30-2 of the MVNO carrier C, as same as in Japan, thereby eliminating an inter-carrier roaming.

It is to be noted that the configuration of FIG. 6 can be applied to a case wherein the terminal 1 in Japan communicating with a facility owned by the carrier A uses an international roaming function to communicate with a connection destination US terminal (the terminal communicating with a facility owned by the carrier B of the United States. In FIGS. 6 and 8, an EPC network based on an actual machine not using virtualization (MVNO carrier C's own EPC) may, as a matter of course, be provided, instead of the virtual EPC network (vEPC) in at least one of the data centers 30-1 and 30-2. In Example Embodiment 1, the case where the MVNO carrier C which is a cloud operator, borrows the facilities 10A and 10B (the base stations 11A and 11B, etc.) owned by the carriers A and B, in Japan and the United States, is described, but, as illustrated in FIG. 2, Example Embodiment 1 is also applicable to a terminal 1C or the like connecting via the Internet, etc., to the data center of the MVNO carrier C, via the facility 10C (base station 11 C, etc.) owned by the MVNO carrier C which is a cloud operator. A terminal (1C in FIG. 2) contracting with the MVNO carrier C, may connect, via the communication facility (10 C in FIG. 2) that the MVNO carrier has borrowed from the carrier A and the Internet, to a first network (32C-1) of the MVNO carrier C in the data center (DC-1) 30-1, and may connect, from the first network (32C-1), via a second network (32C-2) of the MVNO carrier C in the date center (DC-2) 30-2, to a second terminal which connects to the second network (32C-2) via a communication facility that the MVNO carrier C has borrowed from the carrier B, and the Internet.

Example Embodiment 2

Figure 9:
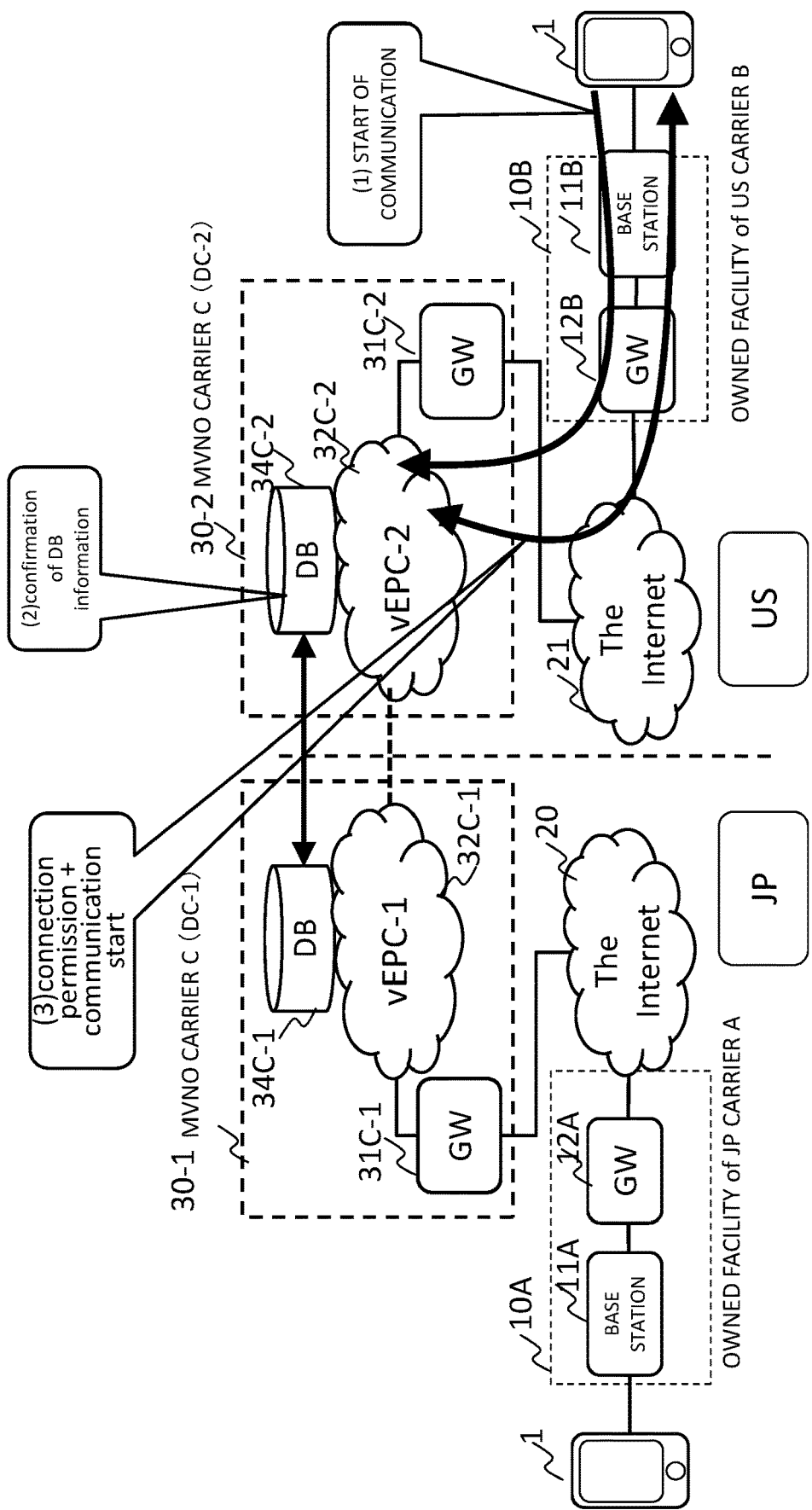
FIG. 9 is a diagram illustrating a basic configuration of Example Embodiment 2.

FIG. 9 is a diagram illustrating Example Embodiment 2. In Example Embodiment 2, a basic configuration is the same as that of Example Embodiment 1 of FIG. 6, but the data center (DC-1) 30-1 and the data center (DC-2) 30-2 of the MVNO carrier C in Japan and in the United States are provided with a database 34C-1 and a database 34C-22, respectively. The database 34C-1 in the data center (DC-1) 30-1 stores user information, and terminal information in the virtual EPC network 32C-1 and the virtual EPC network 32C-2. The database 34C-22 in the data center (DC-2) 30-2 stores user information and terminal information in the virtual EPC network 32C-2, and the virtual EPC network 32C-1. The information of the databases 34C-1 and 34C-2 is synchronously managed so as to be the same. For example, in synchronization with (or asynchronously) updating of one database, replication is performed to the other database to reflect updated contents therein.

The databases 34C-1 and 34C-2 each function as HSS (Home Subscriber Server) in the virtual EPC (vEPC-1) and the virtual EPC (vEPC-2), and store a identifier of SIM (Subscriber Identity Module) card of a terminal 1 (IMSI (International Mobile Subscriber Identity) which is transmitted from a terminal to MME in an attach processing (attachment request) of the terminal), a terminal type (international roaming support terminal), a unique ID given to a subscriber of the MVNO carrier C, contract information such as a type of an international roaming service, and information for managing charge. In this embodiment, the MVNO carrier C provides communication services in Japan by borrowing from the MNO carrier A at least a part (for example, base station 11A, etc.) of facilities 10A owned by the MNO carrier A. In addition, in the United States, the MVNO carrier C, provides communication services by borrowing from the MNO carrier B at least a part (for example, base station 11B, etc.) of facilities 10B owned by the MNO carrier B.

A terminal 1, which is a subscriber of the MVNO carrier C, initiates a connection in the United States (transmits an attachment request message) (1). A predetermined node (for example, virtual MME) of the virtual EPC network 32C-2 (vEPC-2) in the data center (DC-2) 30-2 of the MVNO carrier C in the United States, based on the identification information (IMSI), confirms the user information registered in the database 34C-2 functioning as HSS (2). A predetermined node (for example, a virtual MME) of the virtual EPC network 32C-2 (vEPC-2) in the data center (DC-2) 30-2 allows the terminal 1 to connect to the virtual EPC network 32C-2 (vEPC-2), if a terminal 1 of a user registered in the database 34C-2 is an international roaming support model and if the user has an international roaming service contract. If the user of the terminal 1 is not registered in the database 34C-2, if has not made an international roaming service contract, or if the terminal 1 is not an international roaming support model, the terminal 1 is not allowed to connect to the virtual EPC network 32C-2 (vEPC-2).

Example Embodiment 3

Figure 10:
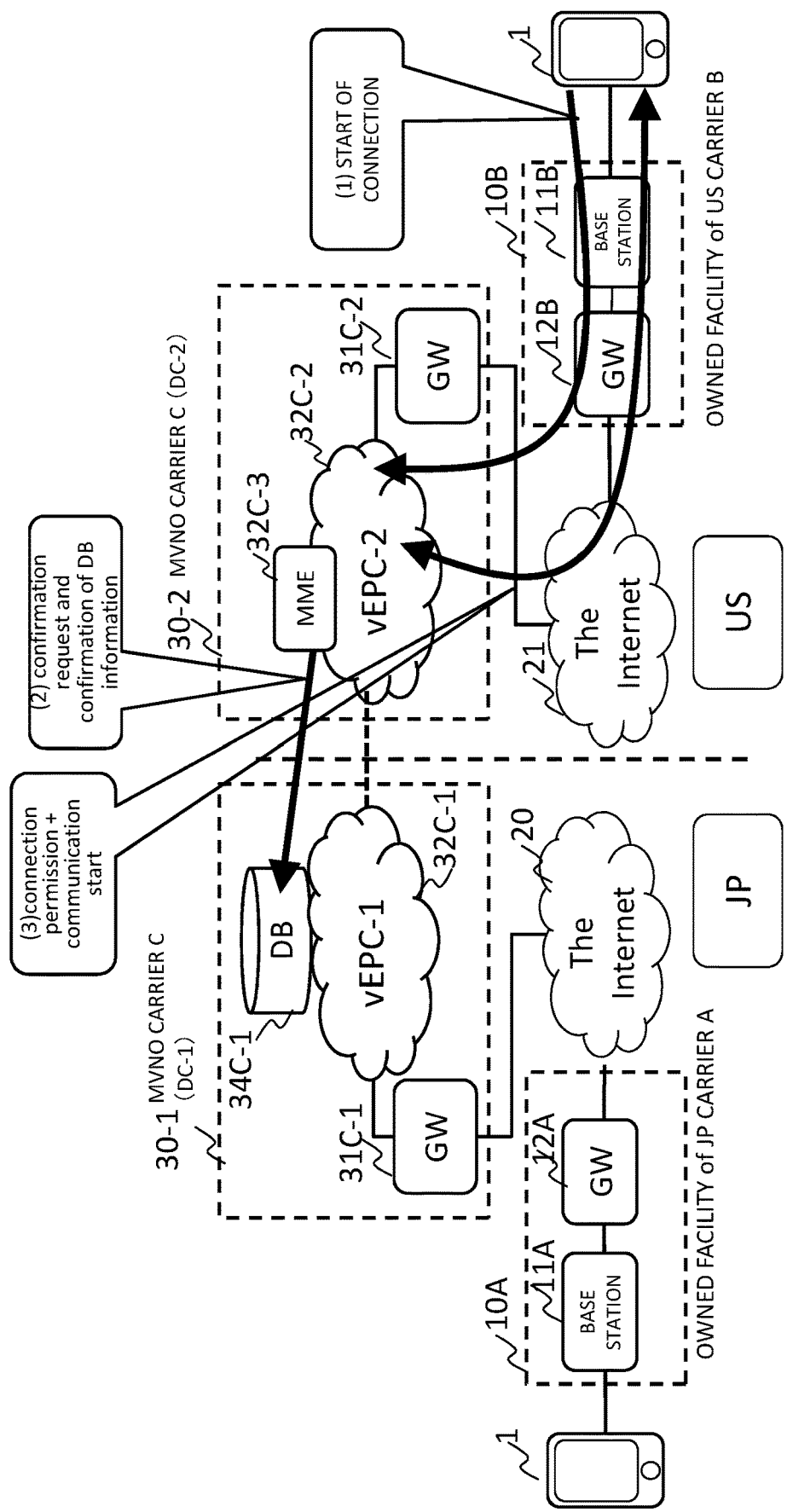
FIG. 10 is a diagram illustrating a basic configuration of Example Embodiment 3.

FIG. 10 is a diagram illustrating Example Embodiment 3. Example embodiment 3 is different from the configuration of Example Embodiment 2 illustrated in FIG. 9 in that the database 34C-2 in the data center (DC-2) 30-2 of the MVNO carrier C in the United States is deleted. The following describes the roaming procedure.

A terminal 1 to be roamed initiates connection in the United States (1).

In response to the connection request from the terminal 1, the virtual MME 32C-3 of the virtual EPC network 32C-2 in the data center (DC-2) of the MVNO carrier C in the United States, issues, to the data center (DC-1) of the MVNO carrier C in Japan, a request for confirmation and information sharing, as to whether or not a user of the terminal 1 is registered.

When the terminal 1 of the user registered in the database 34C-1 is an international roaming-compatible model and the user has an international roaming service contract, the virtual MME 32C-3 allows the terminal 1 to connect to the virtual EPC network 32C-2 (vEPC-2). If the user of the terminal 1 is not registered in the database 34C-1, or has not made an international roaming service contract, or if the terminal 1 is not an international roaming support model, the terminal 1 is not allowed to connect to the virtual EPC network 32C-2 (vEPC-2). When it is confirmed that the user is registered in the data center (DC-1), the data center (DC-2) permits connection of the terminal 1 to the virtual EPC network 32C-2 (vEPC-2).

Example Embodiment 4

Figure 11:
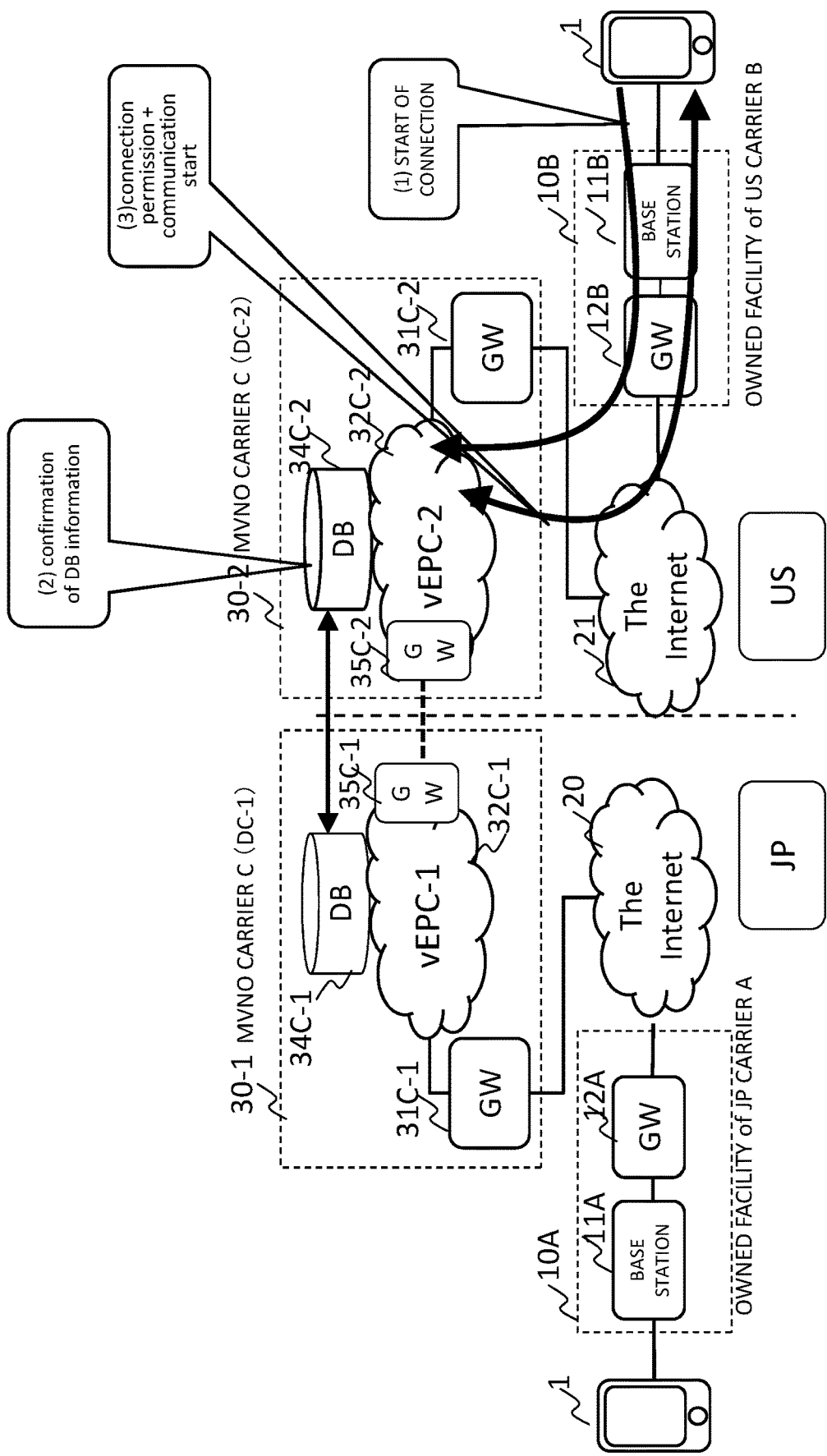
FIG. 11 is a diagram illustrating a modification of Example Embodiment 4.

FIG. 11 is a diagram illustrating Example Embodiment 4. In order to perform synchronization and information exchange between the data center (DC-1) 30-1 of the MVNO carrier C in Japan and the data center (DC-1) 30-2 of the MVNO carrier C in the United States, a tunnel is established by gateways (GW) 31C-1 and 31C-2 of respective virtual EPC networks 32C-1 and 32C-2, and communication is performed through the tunnel. The sequences of the initiation of connection (1), information confirmation of the database 34C-2 (2), allowance f connection and start of communication (3), are the same as those in FIG. 9 and the description thereof will be omitted.

With respect to the gateways (GW) 31C-1 and 31C-2, a gateway (GW) on a transmitting side encapsulates a packet with a tunnel protocol and sets a destination address field of a header to a receiving side gateway (GW). A gateway (GW) on a receiving side decapsulates the packet by removing the added header information and transfers the packet to the virtual EPC network.

As described above, in Example Embodiments 2-4, similarly to Example Embodiment 1, an access to a terminal in the United States is made to the data center (DC-2) 30-2 of the MVNO carrier C which is the same as that in Japan, thereby eliminating inter-carrier roaming.

Example Embodiment 5

Figure 12:
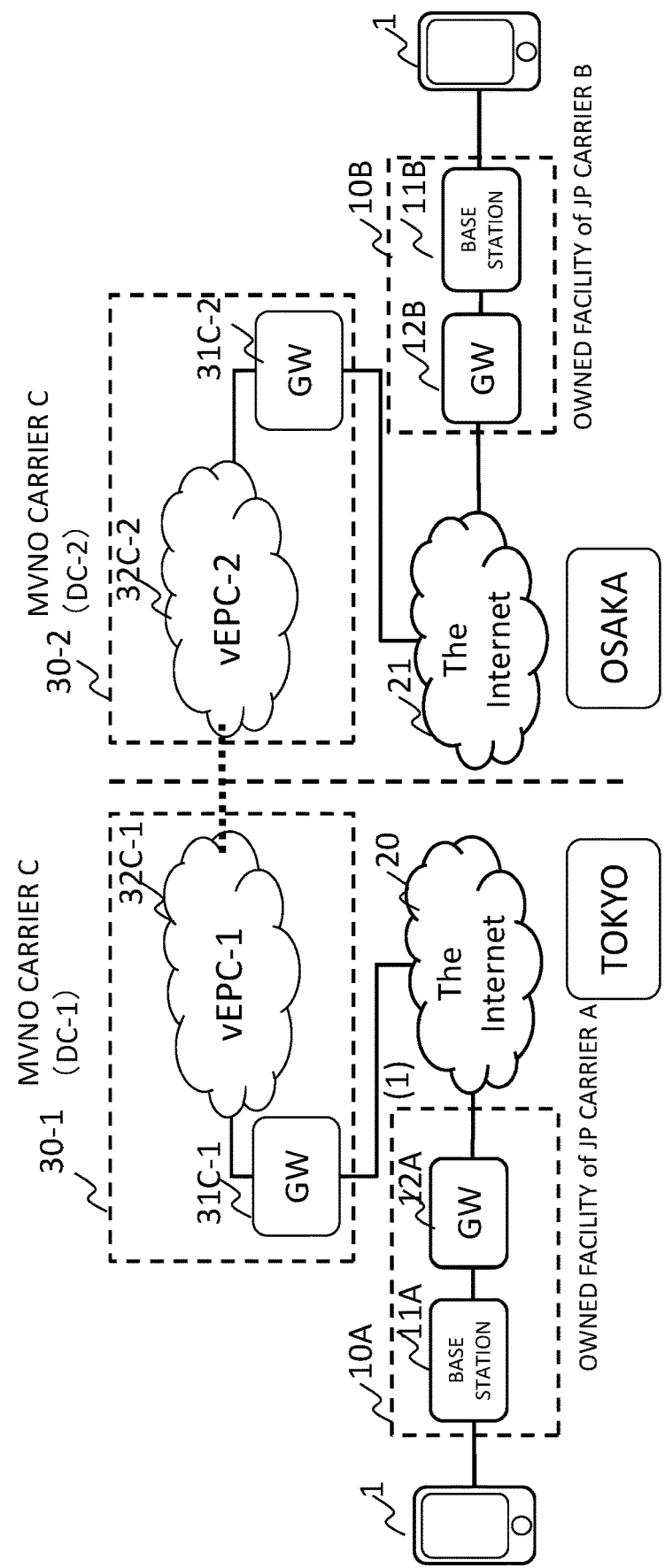
FIG. 12 is a diagram illustrating a modification of Example Embodiment 5.

FIG. 12 is a diagram illustrating Example Embodiment 5. FIG. 12 is the same as the basic configuration of FIG. 6, but the first and second data centers are not arranged in Japan and the United States, but are arranged in Japan (for example, Tokyo and Osaka). In the present Example Embodiment, in Tokyo, the MVNO carrier C provides a communication service by borrowing from the MNO carrier A, for example, at least a part of the owned facility 10A of the MNO carrier A (base station 11A, etc.), while in Osaka, the MVNO carrier C provides a communication service by borrowing from the MNO carrier B, at least a part of the owned facility 10B of the MNO carrier B (base station 11B, etc.). The installation location of the data center is, as a matter of course, not limited to Tokyo and Osaka.

In Example Embodiment 5, as with each of the above-described embodiments, an access of a terminal in Osaka is made to the data center (DC-2) 30-2 of the MVNO carrier C which is the same as that in Tokyo, thereby eliminating inter-carrier roaming.

As described above, communication is not limited to international roaming or the like, as long as the communication is between virtual EPC networks provided in data centers that are disposed apart from each other. In Example Embodiment 5, it goes without saying that the communication network between the data centers 30-1 and 30-2 may include an optical cable network (for example, an optical cable network 41 in FIG. 7). In FIGS. 9 to 12, in at least on one of the data centers 30-1 and 30-2, instead of the virtual EPC network (vEPC), an EPC network based on an actual machine without virtualization (MVNO carrier C's own EPC) may, as a matter of course, be provided.

Each disclosure of the above-listed Patent Literatures 1-3 and Non Patent Literature 1 is incorporated herein by reference. Modification and adjustment of each exemplary embodiment or each example are possible within the scope of the overall disclosure (including the claims) of the present invention and based on the basic technical concept of the present invention. Various combinations and selections of various disclosed elements (including each element in each claim, each element in each example, each element in each drawing, and so on) are possible within the scope of the claims of the present invention. That is, the present invention naturally includes various variations and modifications that could be made by those skilled in the art according to the overall disclosure including the claims and the technical concept.

Although not particularly limited thereto, the above-described embodiments are listed for example, as follows.

Supplementary Note 1

A communication system comprising: at least a first data center providing a cloud service to a user, the first data center comprising:
  at least a first data center providing a cloud service to a user, wherein the first data center comprises:
  a first virtual network that provides a communication service in cooperation with at least a part of a communication facility of at least a first communication operator; and
  a first communication unit that is operable to communicate with a second communication unit in a second data center, wherein first communication unit is operable to transmit to the second communication unit, communication data to be transmitted from a first terminal connecting to the first virtual network via the communication facility of the first communication operator to a second terminal connecting via a communication facility of a second communication operator to a second virtual network in the second data center, the second virtual network providing a communication service in cooperation with at least a part of the communication facility of the second communication operator.

Supplementary Note 2

The communication system according to supplementary note 1, wherein the first virtual network and the second virtual network are provided by the same virtual communication carrier.

Supplementary Note 3

The communication system according to supplementary note 1 or 2, wherein the first data center and the second data center are provided by the same virtual communication carrier.

Supplementary Note 4

The communication system according to supplementary note 2 or 3, wherein a terminal contracting with the virtual communication operator and connecting at a first location to the first virtual network in the first data center,
  connects, at a second location different from the first location, to the second virtual network in the second data center.

Supplementary Note 5

The communication system according to supplementary note 4, wherein the first data center comprises:
  a storage unit that shares, at least one of user information and terminal information of a terminal using the first virtual network and the second virtual network stored therein, with the second data center.

Supplementary Note 6

The communication system according to supplementary note 5, wherein in the first data center, the first communication unit in response to a connection request from the terminal to the second virtual network in the second data center, receives an inquiry issued from the second virtual network, the first communication unit checks whether the terminal is registered in the storage unit, and the first communication unit, and
    if the terminal is registered, the first communication unit allows the terminal to connect to the second virtual network, and start communication by roaming of the terminal.

Supplementary Note 7

The communication system according to any one of supplementary notes 1 to 6, wherein the first virtual network in the first data center includes a virtualized core network.

Supplementary Note 8

A communication apparatus constituting a network of a first data center that provides a cloud service to a user, the apparatus comprising
    a first unit configured to connect to a first virtual network that is included in the first data center and provides a communication service in cooperation with at least a part of a communication facility of a first communication operator, the first unit being operable to communicate with a second data center including a second virtual network providing a communication service in cooperation with at least a part of the communication facility of a second communication operator; and
    a second unit configured to control a transmission destination of communication data transmitted by the first unit, the second unit controlling the first unit to transmit to the second data center, communication data that is to be transmitted from a first terminal connecting via a communication facility of the first communication operator to the first virtual network to a second terminal connecting via a communication facility of a second communication operator to the second virtual network.

Supplementary Note 9

The communication apparatus according to supplementary note 8, wherein the first virtual network and the second virtual network are provided by the same virtual communication carrier.

Supplementary Note 10

The communication apparatus according to supplementary note 8 or 9, wherein the first data center and the second data center are provided by the same virtual communication carrier.

Supplementary Note 11

The communication apparatus according to any one of supplementary notes 8 to 10, wherein at least one of the first virtual network and the second virtual network includes a virtualized core network.

Supplementary Note 12

A communication method comprising:
    a first data center that provides a cloud service, by using a first virtual network that provides a communication service in cooperation with at least a part of a communication facility of a first communication operator, and a first communication unit, being operable to communicate with a second communication unit in a second data center that provides a cloud service and a second virtual network that provides a communication service in cooperation with at least a part of communication facility of a second communication operator; and
    communication data from a first terminal connecting via the communication facility of the first communication operator to the first virtual network in the first data center, being capable to be transmitted via the first communication unit of the first data center and via the second communication unit of the second data center, to a second terminal connecting via the communication facility of the second communication operator to the second virtual network in the second data center.

Supplementary Note 13

The communication method according to supplementary note 12, wherein the first virtual network and the second virtual network are provided by the same virtual communication carrier.

Supplementary Note 14

The communication method according to supplementary note 12 or 13, wherein the first data center and the second data center are provided by the same virtual communication carrier.

Supplementary Note 15

The communication method according to supplementary note 13 or 14, comprising:
    a terminal of a user contracting with the virtual communication operator, at a first location, connecting to the first virtual network in the first data center,
    at a second location different from the first location, accessing to a second data center provided apart from the first data center and including a second virtual network of the virtual communication operator, and connecting to the second virtual network.

Supplementary Note 16

The communication method according to supplementary note 15, comprising
    the first data center sharing with the second data center, at least one of user information and terminal information of a terminal using the first virtual network and the second virtual network.

Supplementary Note 17

The communication method according to supplementary note 16, comprising:
    the first data center, in response to a connection request from the terminal to the second virtual network in the second data center, receiving an inquiry issued from the second virtual network;
    checking whether the terminal is registered in the storage unit; and
    if the terminal is registered, allowing the terminal to connect to the second virtual network, to start communication by roaming of the terminal.

Supplementary Note 18

The communication method according to any one of supplementary notes 12 to 17, wherein the first virtual network in the first data center includes a virtualized core network.

Supplementary Note 19

A non-transitory computer-readable recording medium storing therein a program causing a computer of a communication apparatus constituting a network in a first data center providing a cloud service to a user, to execute:
  a first processing to connect to a first virtual network that is included in the first data center and provides a communication service in cooperation with at least a part of a communication facility of a first communication operator, the first processing operable to communicate with a second data center including a second virtual network providing a communication service in cooperation with at least a part of the communication facility of the second communication operator; and
  a second processing to control a transmission destination of communication data transmitted by the first processing,
  the second processing controlling the first processing to transmit to the second data center, communication data that is to be transmitted from a first terminal connecting to the first virtual network via a communication facility of the first communication operator to a second terminal connecting via a communication facility of a second communication operator to the second virtual network.

Supplementary Note 20

The non-transitory computer-readable recording medium according to supplementary note 19, wherein the first virtual network and the second virtual network are provided by the same virtual communication operator.

Supplementary Note 21

The non-transitory computer-readable recording medium according to supplementary note 19 or 20, wherein the first data center and the second data center are provided by the same virtual communication operator.

Supplementary Note 22

The non-transitory computer-readable recording medium according to any one of supplementary notes 19 to 21, wherein at least one of the first virtual network and the second virtual network includes a virtualized core network.

The invention claimed is:

1. A communication system comprising:
  a first data center that is owned and operated by a mobile virtual communication operator, and is configured to provide a cloud service by the mobile virtual communication operator and communicate with a second data center that is also owned and operated by the mobile virtual communication operator,
  wherein the first data center comprises:
    a first mobile virtual network configured to provide a communication service to a first user terminal in cooperation with a first base station provided in a first communication facility of a first mobile communication operator; and
    a first gateway configured to communicate with a second gateway in the second data center,
  wherein the second data center provides the cloud service by the mobile virtual communication operator,
  wherein the first gateway is configured to transmit to the second gateway, communication data transmitted from the first user terminal to a second user terminal, the second user terminal connecting to a second base station provided in a second communication facility of a second mobile communication operator, and
  wherein the first mobile virtual network in the first data center includes a first virtualized core network that is configured to transmit the communication data from the first user terminal to the second user terminal through a second virtualized core network implemented in the second data center.

2. The communication system according to claim 1, wherein the first mobile virtual network in the first data center and a second mobile virtual network in the second data center are provided by the mobile virtual communication operator.

3. The communication system according to claim 2, wherein a terminal contracting with the mobile virtual communication operator and connecting at a first location to the first mobile virtual network in the first data center, connects, at a second location different from the first location, to the second mobile virtual network in the second data center.

4. The communication system according to claim 3, wherein the first data center comprises:
  a storage that shares, at least one of user information and terminal information of the terminal that uses the first mobile virtual network and the second mobile virtual network stored therein, with the second data center.

5. The communication system according to claim 4, wherein in the first data center, the first gateway, in response to a connection request from the terminal to connect to the second mobile virtual network in the second data center, receives an inquiry issued from the second mobile virtual network,
  the first gateway checks whether the terminal is registered in the storage, and
  if the terminal is registered in the storage, the first gateway allows the terminal to connect to the second mobile virtual network and start communication by roaming of the terminal.

6. The communication system according to claim 1, wherein
  the first user terminal contracting with the mobile virtual communication operator connects, via the first communication facility, to the first mobile virtual network in the first data center, and from the first mobile virtual network, via a second mobile virtual network provided by the mobile virtual communication operator in the second data center, to a second terminal connecting via the second communication facility to the second mobile virtual network.

7. The communication system according to claim 1, wherein a first database stored in the first data center is synchronously managed with a second database stored in the second data center.

8. The communication system according to claim 1, wherein the first gateway transmits, to the second gateway, a request for confirmation as to whether a user of the first user terminal is registered, receives from the second gateway, a response to the request for confirmation, and controls access of the first user terminal based on the response to the request for confirmation.

9. The communication system according to claim 1, wherein the first gateway establishes a tunnel with the second gateway, encapsulates a packet to be transmitted from the first gateway to the second gateway based on a tunnel protocol, and transmits the packet to the second gateway using the tunnel.

10. A communication apparatus constituting a network of a first data center that is owned and operated by a mobile virtual communication operator, and provides a cloud service by the mobile virtual communication operator, the communication apparatus comprising:
a processor; and
a memory storing a program executable by the processor, wherein the processor, based on the program stored in the memory, is configured to execute:
a communication process to connect to a first mobile virtual network that is included in the first data center and provide a communication service to a first user terminal in cooperation with a first base station provided in a first communication facility of a first mobile communication operator, the communication process being configured to communicate with a second data center that is owned and operated by the mobile virtual communication operator; and
a control process to control a transmission destination of communication data transmitted by the communication process, the control process being configured to control the communication process to transmit to the second data center, communication data transmitted from the first user terminal to a second user terminal, the second user terminal connecting to a second base station provided in a second communication facility of a second communication operator,
wherein the first mobile virtual network in the first data center includes a first virtualized core network that is configured to transmit the communication data from the first user terminal to the second user terminal through a second virtualized core network implemented in a second mobile virtual network in the second data center.

11. The communication apparatus according to claim 10, wherein the first mobile virtual network in the first data center and the second mobile virtual network in the second data center are provided by the mobile virtual communication operator.

12. A communication method comprising:
a first data center that is owned and operated by a mobile virtual communication operator, and provides a cloud service by the mobile virtual communication operator, by using a first mobile virtual network configured to provide a communication service to a first user terminal in cooperation with a first base station provided in a first communication facility of a first mobile communication operator, and a first gateway configured to communicate with a second gateway in a second data center that is owned and operated by the mobile virtual communication operator; and
communicating data from the first user terminal to a second user terminal, the second user terminal connecting to a second base station provided in a second communication facility of a second mobile communication operator,
wherein the first mobile virtual network in the first data center includes a first virtualized core network, and
wherein the communicating the data from the first user terminal to the second user terminal comprises transmitting the data from the first user terminal to the second user terminal through a second virtualized core network implemented in a second mobile virtual network in the second data center.

13. The communication method according to claim 12, wherein the first mobile virtual network in the first data center and the second mobile virtual network in the second data center are provided by the mobile virtual communication operator.

14. The communication method according to claim 13, comprising:
a terminal of a user contracting with the mobile virtual communication operator, at a first location, connecting to the first mobile virtual network in the first data center; and
the terminal, at a second location different from the first location, accessing to the second data center connecting to the second mobile virtual network.

15. The communication method according to claim 14, comprising
the first data center sharing with the second data center, at least one of user information and terminal information of the terminal using the first mobile virtual network and the second mobile virtual network.

16. The communication method according to claim 15, comprising:
the first data center, in response to a connection request from the terminal to connect to the second mobile virtual network in the second data center, receiving an inquiry issued from the second mobile virtual network;
checking whether the terminal is registered in a storage of the first data center; and
if the terminal is registered in the storage, allowing the terminal to connect to the second mobile virtual network, to start communication by roaming of the terminal.

17. The communication method according to claim 12, comprising:
the first user terminal that contracts with the mobile virtual communication operator, connecting via the first communication facility to the first mobile virtual network in the first data center, and from the first mobile virtual network, via the second mobile virtual network provided by the mobile virtual communication operator in the second data center, to a second terminal connecting via the second communication facility to the second mobile virtual network.

* * * * *